US008783404B2

(12) United States Patent
Kotaki et al.

(10) Patent No.: US 8,783,404 B2
(45) Date of Patent: Jul. 22, 2014

(54) VEHICLE BRACKET

(75) Inventors: Tomoaki Kotaki, Saitama (JP); Atsushi Shioda, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/575,705

(22) PCT Filed: Jan. 26, 2011

(86) PCT No.: PCT/JP2011/051491
§ 371 (c)(1),
(2), (4) Date: Jul. 27, 2012

(87) PCT Pub. No.: WO2011/093336
PCT Pub. Date: Aug. 4, 2011

(65) Prior Publication Data
US 2012/0298603 A1 Nov. 29, 2012

(30) Foreign Application Priority Data
Jan. 29, 2010 (JP) .................. 2010-017608

(51) Int. Cl.
*B60T 17/06* (2006.01)
*B60T 17/04* (2006.01)
*B60T 17/02* (2006.01)

(52) U.S. Cl.
CPC ............ *B60T 17/06* (2013.01); *B60T 17/04* (2013.01); *B60T 17/02* (2013.01)
USPC ....................................... 180/274

(58) Field of Classification Search
CPC .......... B60T 17/02; B60T 17/04; B60T 17/06
USPC ....................................... 180/274
See application file for complete search history.

(56) References Cited

U.S. PATENT DOCUMENTS

| 6,209,948 | B1 | 4/2001 | Mori et al. |
| 7,246,636 | B2 * | 7/2007 | Dudra et al. ............. 137/565.17 |
| 7,506,715 | B2 * | 3/2009 | Averdiek et al. ............. 180/274 |

FOREIGN PATENT DOCUMENTS

| CN | 1209100 A | 2/1999 |
| JP | 11-334570 A | 12/1999 |

(Continued)

OTHER PUBLICATIONS

Chinese Office Action issued on Mar. 7, 2014 in the corresponding CN Patent Application 201180007464.X.

*Primary Examiner* — Nicole Verley
(74) *Attorney, Agent, or Firm* — Carrier Blackman & Associates, P.C.; Joseph P. Carrier; Jeffrey T. Gedeon

(57) ABSTRACT

A bracket (3) is installed in an engine room (12) of a vehicle (1) for supporting accessories (2). The bracket (3) includes: an upper anchoring portion (3a) and a lower anchoring portion (3b) each for anchoring the bracket (3) to the vehicle body (11); and a first supporting portion (3c) and a second supporting portion (3d) for securing the accessories (2) thereto, respectively. The lower anchoring portion (3b) is located below the upper anchoring portion (3a). The first supporting portion (3c) extends vertically between the upper anchoring portion (3a) and the lower anchoring portion (3b). The second supporting portion (3d) extends from the upper anchoring portion (3a) and is horizontally opposed to the first supporting portion (3c). The upper anchoring portion (3a), the lower anchoring portion (3b), the first supporting portion (3c), and the second supporting portion (3d) form an integrated body.

7 Claims, 7 Drawing Sheets

(56) References Cited

FOREIGN PATENT DOCUMENTS

| | | | |
|---|---|---|---|
| JP | 3536621 B2 | | 6/2004 |
| JP | 2006-022888 A | | 1/2006 |
| JP | 2006-264429 A | | 10/2006 |
| JP | 2006264429 A | * | 10/2006 |
| JP | 3993374 B2 | | 10/2007 |
| JP | 2008-037301 A | | 2/2008 |
| JP | 2008-068717 A | | 3/2008 |
| JP | 2008068717 A | * | 3/2008 |
| JP | 2009262880 A | * | 11/2009 |
| JP | 2010006111 A | * | 1/2010 |
| JP | 2010007690 A | * | 1/2010 |
| JP | 2010221727 A | * | 10/2010 |
| JP | 2012192762 A | * | 10/2012 |
| JP | 2012192763 A | * | 10/2012 |

* cited by examiner

VEHICLE BRACKET

TECHNICAL FIELD

The present invention relates to a vehicle bracket installed in an engine room of a vehicle for supporting an accessory or accessories such as a brake reservoir (also referred to as the "brake reservoir tank") and a clutch reservoir (also referred to as the "clutch reservoir tank").

BACKGROUND ART

Conventionally, accessories, such as a brake reservoir and a clutch reservoir, which indirectly assist driving of a vehicle powered by an engine, are secured to a bracket that is bolted to an inner wall of an engine room (see Patent Documents 1 and 2, for example). In general, the brake reservoir (reservoir tank) is located immediately below a hood, as mentioned in Patent Documents 1 and 2.

The hood serves as a cushioning member to protect a pedestrian who has been hit by the vehicle and thrown up by a front bumper onto the hood. For this purpose, such hoods are currently in use that are thin and easily deformable and possess cushioning properties enough to absorb the impact of collision with the pedestrian.

Patent Document 3 discloses a conventional structure for securing a reservoir tank, which structure absorbs the impact on the brake reservoir immediately below the hood, which has been deformed by the pedestrian falling onto the hood.

The structure for securing a reservoir tank of Patent Document 3 relieves the impact by downwardly displacing the brake reservoir, together with a bracket that holds the brake reservoir, while maintaining the brake reservoir at a predetermined height relative to a master cylinder by means of a stopper when the impact downwardly applied to the hood (bonnet) extends to the brake reservoir through the deformation of the hood.

FIG. 6 is an exploded perspective view of a conventional bracket, a propping-up jig, and a brake-fluid vacuum charging jig, used for securing a brake reservoir to a vehicle body. FIG. 7 is a perspective view of the conventional bracket, the propping-up jig, and the brake-fluid vacuum charging jig, with the propping-up jig and the brake-fluid charging jig attached to the brake reservoir that is secured to the conventional bracket fixed to the vehicle body.

As shown in FIGS. 6 and 7, an accessory 200 such as the conventional brake reservoir 210 is secured by bolting to an upper support piece 301 of the bracket 300 that has a U-shaped vertical cross section. The bracket 300 is anchored to an inner wall 110 of an engine room 100. A brake fluid (brake oil) is injected into the brake reservoir 210 through a brake-fluid vacuum charging jig 400 attached to the brake reservoir 210 while loads of the brake reservoir 210 and the brake-fluid vacuum charging jig 400 are being applied to the bracket 300.

A lower support member 320 is welded to the bracket 300 so that the propping-up jig 500 can be detachably engaged between the lower support member 320 and the upper support piece 301 for ensuring a strength to resist against a load applied to the upper support piece 301 at the time of the brake fluid injection. The upper support piece 301 has a hole 302 formed therethrough for receiving a bolt 600 and a nut 330 welded onto a lower surface of the support piece 301, to fix the brake reservoir 210.

Further, for protecting the pedestrian at the time of collision, a bracket body 310, which is a metal plate member, is bent in an L-shape in order for the upper support piece 301 to be elastic and slightly less strong, thereby improving a function of the bracket 300 to absorb an energy of collision impact.

PRIOR ART DOCUMENTS

Patent Documents

Patent Document 1: U.S. Pat. No. 3,536,621 (FIG. 1)
Patent Document 2: U.S. Pat. No. 3,993,374 (FIG. 1)
Patent Document 3:
Japanese Unexamined Patent Publication Application No. 2008-68717 (FIGS. 1-6)

SUMMARY OF THE INVENTION

Problem that the Invention is to Solve

As described above, the bracket 300, which has a strength reduced to protect the pedestrian, requires the propping-up jig 500 to receive the load of the brake-fluid vacuum charging jig 400 at the time of vacuum charging of the brake fluid.

The use of the propping-up jig 500 to support the brake-fluid vacuum charging jig 400 from below at the time of vacuum charging of the brake fluid leads to increases in the number of processing tools and steps to be involved in the use of the propping-up jig 50, resulting in a problem of a reduced efficiency in the charging operation.

It is an object of the present invention to provide a vehicle bracket that has both a strength to support loads of a brake-fluid vacuum charging jig and the like and an ability to absorb the impact to protect the pedestrian.

Means for Solving the Problem

In a first aspect, there is provided a vehicle bracket installed in an engine room of a vehicle for supporting accessories, the vehicle bracket comprising: an upper anchoring portion for anchoring the vehicle bracket to a vehicle body; a lower anchoring portion for anchoring the vehicle bracket to the vehicle body, the lower anchoring portion located below the upper anchoring portion; a first supporting portion for securing one of the accessories thereto, the first supporting portion extending vertically between the upper anchoring portion and the lower anchoring portion; and a second supporting portion for securing the other accessory thereto, the second supporting portion extending from the upper anchoring portion and being horizontally opposed to the first supporting portion, the upper anchoring portion, the lower anchoring portion, the first supporting portion, and the second supporting portion forming an integrated body.

The vehicle bracket in the first aspect is supported by the vehicle body at two upper and lower points: the upper anchoring portion and the lower anchoring portion. The upper anchoring portion and the lower anchoring portion are parts of an integrated body and are sufficiently spaced apart from each other to create a large span therebetween and thereby to ensure firm fixation of the bracket to the vehicle body. Thus, the vehicle bracket is fixed to the vehicle body with an increased strength. Further, the vehicle bracket has the first supporting portion and the second supporting portion integrated with each other. The first supporting portion extends vertically from the upper anchoring portion. The second supporting portion extends from the upper anchoring portion and is horizontally opposed to the first supporting portion. Thus, the vehicle bracket has an extra moment created according to the extensions of the respective supporting portions, and as a result, is easily elastically deformed when a load is downwardly applied. Consequently, the vehicle bracket has as sufficiently as the increased strength an increased ability to absorb the impact to protect the pedestrian.

In a second aspect, the vehicle bracket in the first aspect may be configured in such a manner that: the first supporting portion is formed as a part of a ring section having an approximately ring shape; and the ring section is capable of having a component inserted therethrough to facilitate installation of the component in an engine room.

According to the vehicle bracket in the second aspect, the first supporting portion is formed as a part of the ring section. Thus, when the ring section is fixed at both base ends thereof to the vehicle body, a vertical cross section of the ring section forms a close ring. In this state, the vehicle bracket is supported at each of the base ends like a cantilever. Thus, the vehicle bracket has an increased strength to support the load. The ring portion, which is elastically deformed with the both base ends serving as fulcrums when the load is applied thereto, has a high ability to absorb the impact. Further, the ring section is capable of having a component inserted therethrough to facilitate installation of the component in an engine room. Thus, inserting the component through the ring portion allows effective use of a space to save space. Note that the vehicle bracket may be used as a support of a pipe by inserting the pipe through the ring section.

In a third aspect, the vehicle bracket in the first aspect may be configured in such a manner that: the accessory secured to the first supporting portion is a brake reservoir, and the accessory secured to the second supporting portion is a clutch reservoir.

In a fourth aspect, the vehicle bracket in the second aspect may be configured in such a manner that: the accessory secured to the first supporting portion is a brake reservoir; and the accessory secured to the second supporting portion is a clutch reservoir.

The vehicle brackets in the third and fourth aspects are each able to have the brake reservoir secured to the first supporting portion and the clutch reservoir secured to the second supporting portion. Thus, each single bracket has a plurality of components or a plurality of kinds of components secured thereto. Consequently, the vehicle brackets are able to offer more design freedom in and around an area to which each of the vehicle brackets is anchored.

In a fifth aspect, the vehicle bracket in any one of the first to fourth aspects may be configured in such a manner that the vehicle bracket is formed of a plurality of plate members joined together by welding.

The vehicle bracket in the fifth aspect is formed of the plurality of plate members joined together by welding. Thus, it is easy to manufacture a vehicle bracket with a complicated shape. Further, the vehicle brackets each formed of the plurality of plate members can be joined together to obtain a vehicle bracket as a fixing device for securing a plurality of components thereto.

In a sixth aspect, there is provided a vehicle bracket installed in an engine room of a vehicle for supporting an accessory, the vehicle bracket comprising: an upper anchoring portion for anchoring the vehicle bracket to a vehicle body; a lower anchoring portion for anchoring the vehicle bracket to the vehicle body; and a supporting portion for securing the accessory thereto, the supporting portion extending vertically between the upper anchoring portion and the lower anchoring portion and being horizontally distanced from the upper anchoring portion.

According to the vehicle bracket in the sixth aspect, the vertically extending supporting portion for securing the accessory thereto is horizontally sufficiently distanced from the upper anchoring portion to prolong the distance between the supporting portion for securing the accessory thereto and the upper anchoring portion. This results in a large span for supporting the vehicle bracket. Consequently, when a load is applied to the vehicle bracket, the vehicle bracket easily absorbs the load impact by being elastically deformed while receiving the load.

Effect of the Invention

The vehicle bracket according to the present invention has both a strength to support loads of a brake-fluid vacuum charging jig and the like and an ability to absorb the impact to protect the pedestrian.

Figure 1:
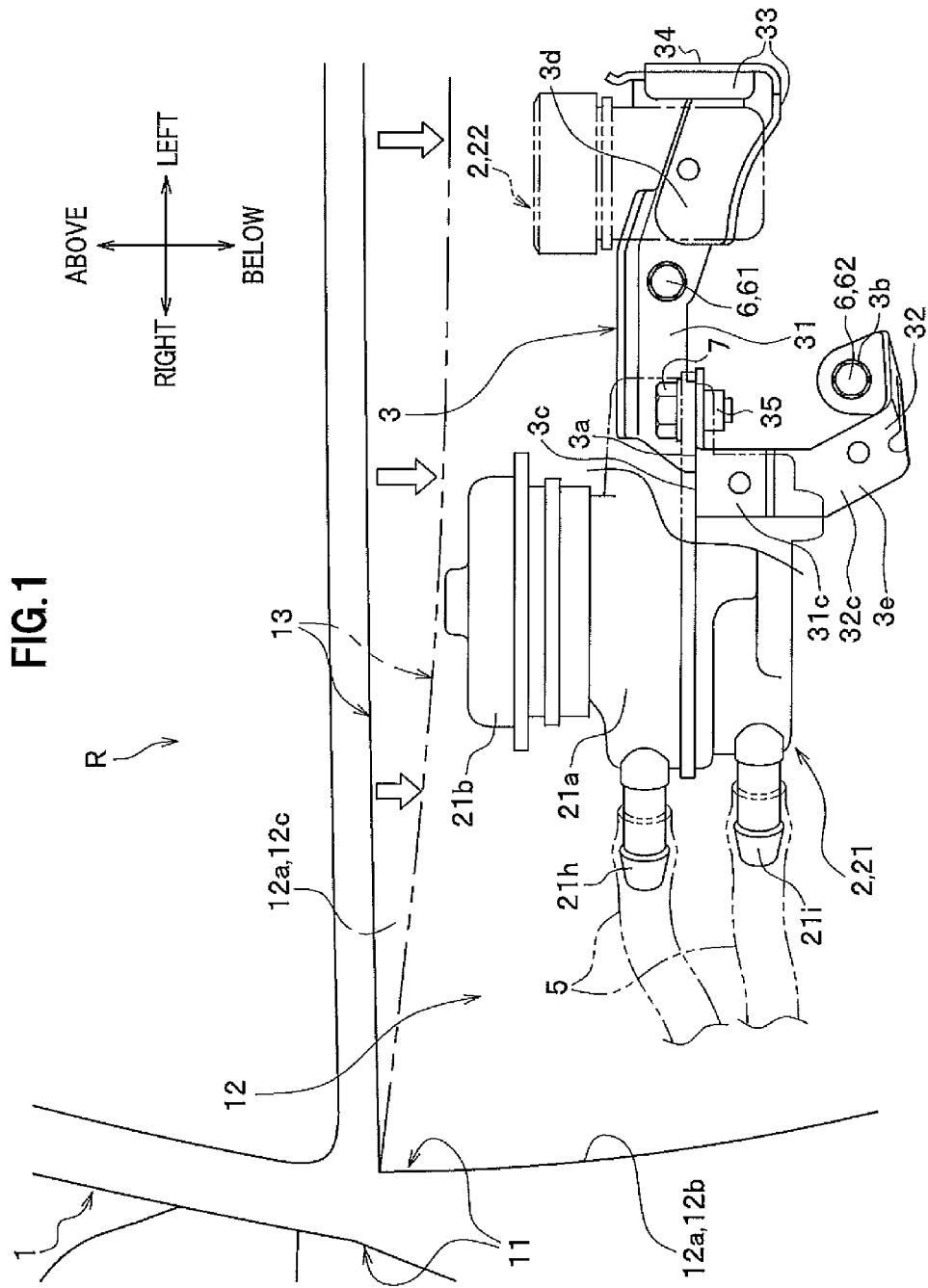
FIG. 1 is a front view of a vehicle bracket according to an embodiment of the present invention, the view showing an example of a state in which the vehicle bracket is installed.

EXPLANATION OF REFERENCES 1 vehicle
2 accessory
3 bracket (vehicle bracket)
3a upper anchoring portion
3b lower anchoring portion
3c first supporting portion (supporting portion)
3d second supporting portion
3e ring portion
8 component
11 vehicle body
12 engine room
21 brake reservoir
22 clutch reservoir
31 first plate member (plate member)
32 second plate member (plate member)
33 third plate member (plate member)
34 fourth plate member (plate member)

MODE FOR CARRYING OUT THE INVENTION

Next, descriptions will be made of an example of a vehicle bracket according to an embodiment of the present invention with reference to FIGS. 1-5.

The orientation of the vehicle bracket 3 (hereinafter referred to simply as the "bracket 3") may vary according to the shape of a wall surface to which the vehicle bracket 3 is anchored. For the sake of convenience, "front" refers to a forward direction of the vehicle 1, "back" refers to a backward direction thereof, and "right" and "left" refer to transverse directions thereof. Before descriptions of the bracket 3, descriptions will be made of a vehicle 1, in which the bracket 3 is installed, and a vehicle body 11.

<Configuration of Vehicle>

As shown in FIG. 1, the vehicle 1 is a vehicle that has an engine room 12 at the front of the vehicle body 11. In the engine room 12, the bracket 3 is installed for supporting an accessory or accessories 2.

There are no particular limitations imposed on the model and the like of the vehicle 1 as long as the vehicle 1 has the engine room 12. That is, the vehicle 1 may be a bus, a truck, a service vehicle or the like. In the following paragraphs, the bracket 3 is described referring, as an example, to a bonnet-type passenger vehicle with the engine room 12 at the front of the vehicle body 11.

<Configuration of Vehicle Body>

As shown in FIG. 1, the vehicle body 11 mainly comprises an unillustrated skeletal frame, which constitutes a skeleton of the vehicle, and a body panel. The vehicle body 11 has, in front of a vehicle compartment R, the engine room 12 with an upper opening to be opened and closed by a hood 13.

<Configuration of Engine Room>

As shown in FIG. 1, the engine room 12 is a space for accommodating an engine (not shown). The engine room 12, which has an inner wall 12a and the hood 13, is made hollow. The engine room 12 has inside it the accessory or accessories 2 that are peripheral devices required for driving the engine to run the vehicle 1.

The inner wall 12a is an area on which, for example, the bracket 3 is to be installed. The inner wall 12a is made up of side walls 12b, 12b on the right and left, a partition wall 12c, and a front grille (not shown). The partition wall 12c separates the engine room 12 from the vehicle compartment R. The front grille defines a front wall of the engine room 12.

The side walls 12b, 12b comprise metal panels fixed to a pair of unillustrated side members on the right and left.

The partition wall 12c comprises a metal panel fixed to the right and left side members and to a cross member (not shown) disposed perpendicularly to the side members.

<Configuration of Accessory or Accessories>

The accessory or accessories 2 may be any devices necessary for driving the engine to run the vehicle 1. The accessory or accessories 2 are, for example, a brake reservoir 21 for foot braking and a clutch reservoir 22 (see FIG. 4), and are bolted onto the bracket 3 secured to the inner wall 12a of the engine room 12.

<Configuration of Brake Reservoir>

As shown in FIG. 1, the brake reservoir 21 is a tank to reserve a brake fluid in for braking. The brake reservoir 21 mainly includes a resin tank body 21a and a cap 21b for closing a cavity 21c (see FIG. 2) of the tank body 21a. The brake reservoir 21 is positioned higher than a brake master cylinder (not shown) in the engine room 12 to prevent the air from entering the brake master cylinder (not shown) when the brake fluid is supplied to the brake master cylinder (not shown) which is a receptacle of the supplied brake fluid.

Figure 2:
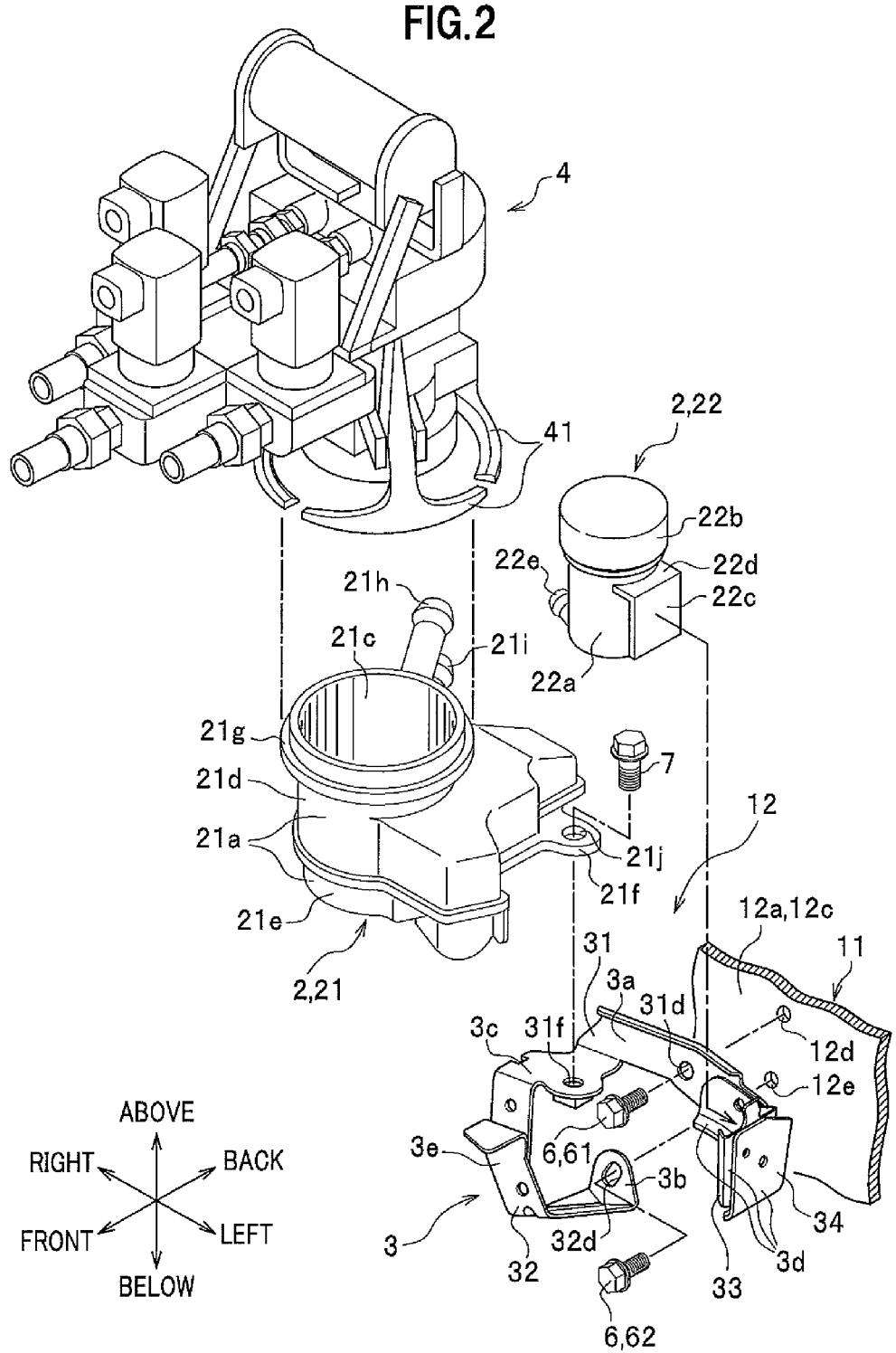
FIG. 2 is an exploded perspective view of the vehicle bracket according to the embodiment of the present invention, the view showing a state in which accessories are secured thereto.

As shown in FIG. 2, the tank body 21a is, for example, a resin container formed as an integrated body by joining an upper case 21d to be an upper section and a lower case 21e to be a lower section of the tank body 21a. A seam between the lower case 21e and the upper case 21d has a fixing piece 21f projecting therefrom for fixation of the bracket 3 by placing the fixing piece 21f on a first supporting portion 3c of the bracket 3.

The upper case 21d has the cavity 21c, a ring-shaped flange portion 21g and a tube-connecting portion 21h by integral molding. The flange portion 21g is formed along an outer periphery of the cavity 21c. The tube-connecting portion 21h is connected to one end of one of tubes 5 (see FIG. 1) the other end of which is connected to the master cylinder (not shown).

The lower case 21e is formed with the fixing piece 21f and a tube-connecting portion 21i. The tube-connecting portion 21i is connected to one end of the other tube 5 (see FIG. 1) the other end of which is connected to the master cylinder (not shown).

The fixing piece 21f is a thick tab with a through hole 21j formed through it for permitting insertion of a reservoir-fixing bolt 7 therethrough. The reservoir-fixing bolt 7 has threads formed on an external surface thereof.

Figure 3:
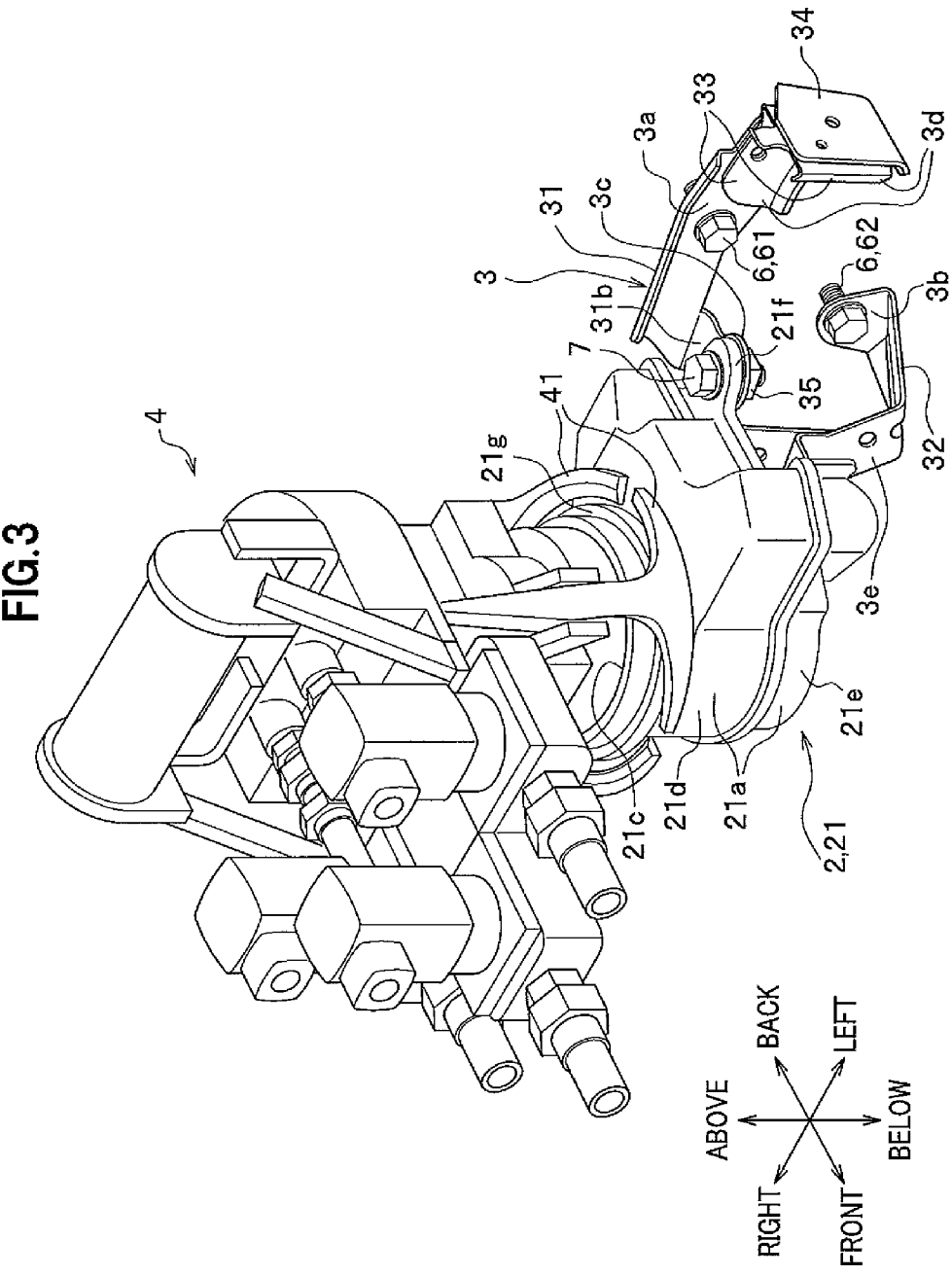
FIG. 3 is a perspective view of the vehicle bracket according to the embodiment of the present invention, the view showing a state in which the accessories are secured thereto.

The flange portion 21g is a section to be coupled with a coupling portion 41 of the brake-fluid vacuum charging jig 4 for injecting the brake fluid into the cavity 21c of the brake reservoir 21 (see FIG. 3).

Figure 6:
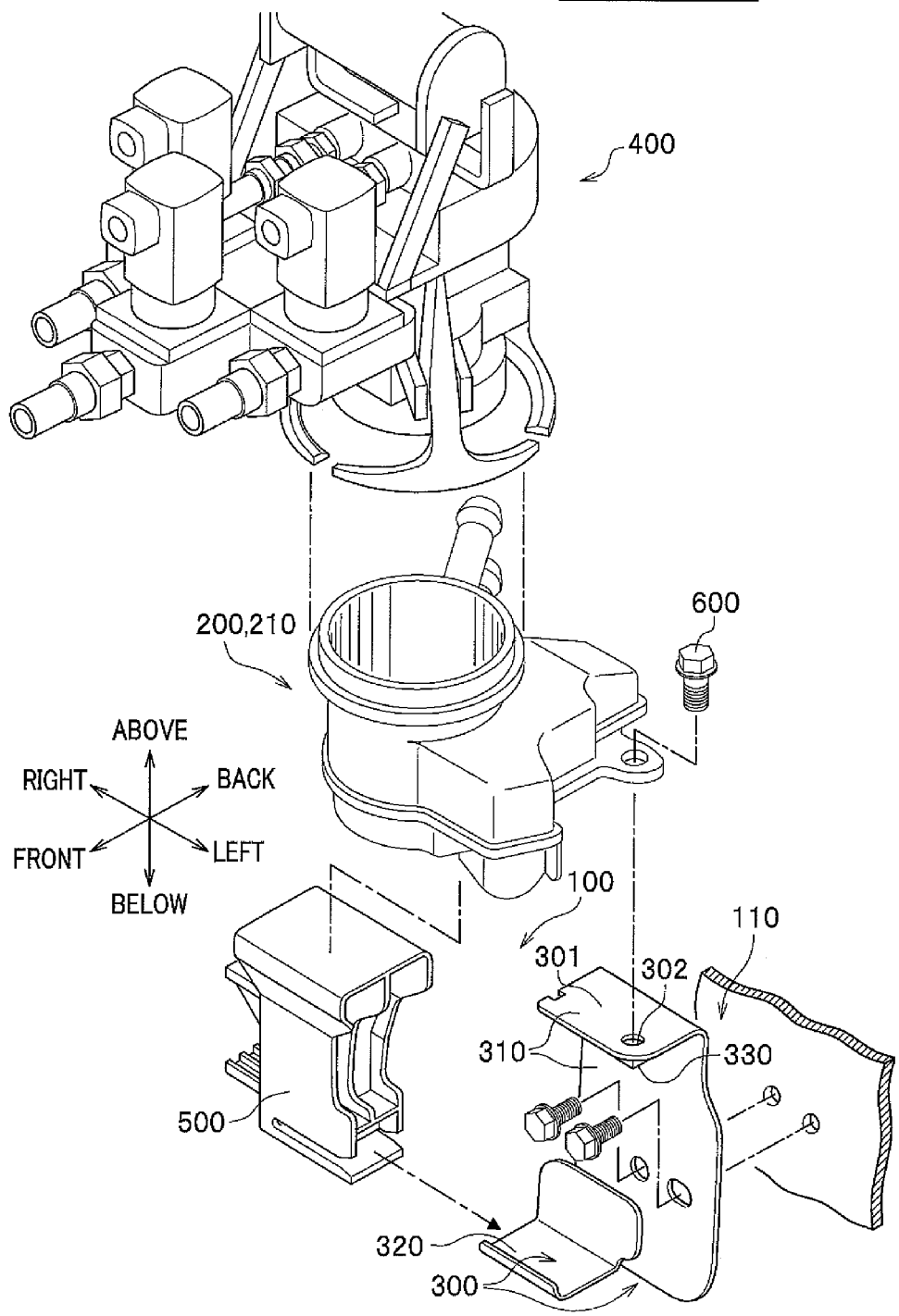
FIG. 6 is an exploded perspective view of a conventional bracket, the view showing a state that an accessory is secured thereto.
Figure 7:
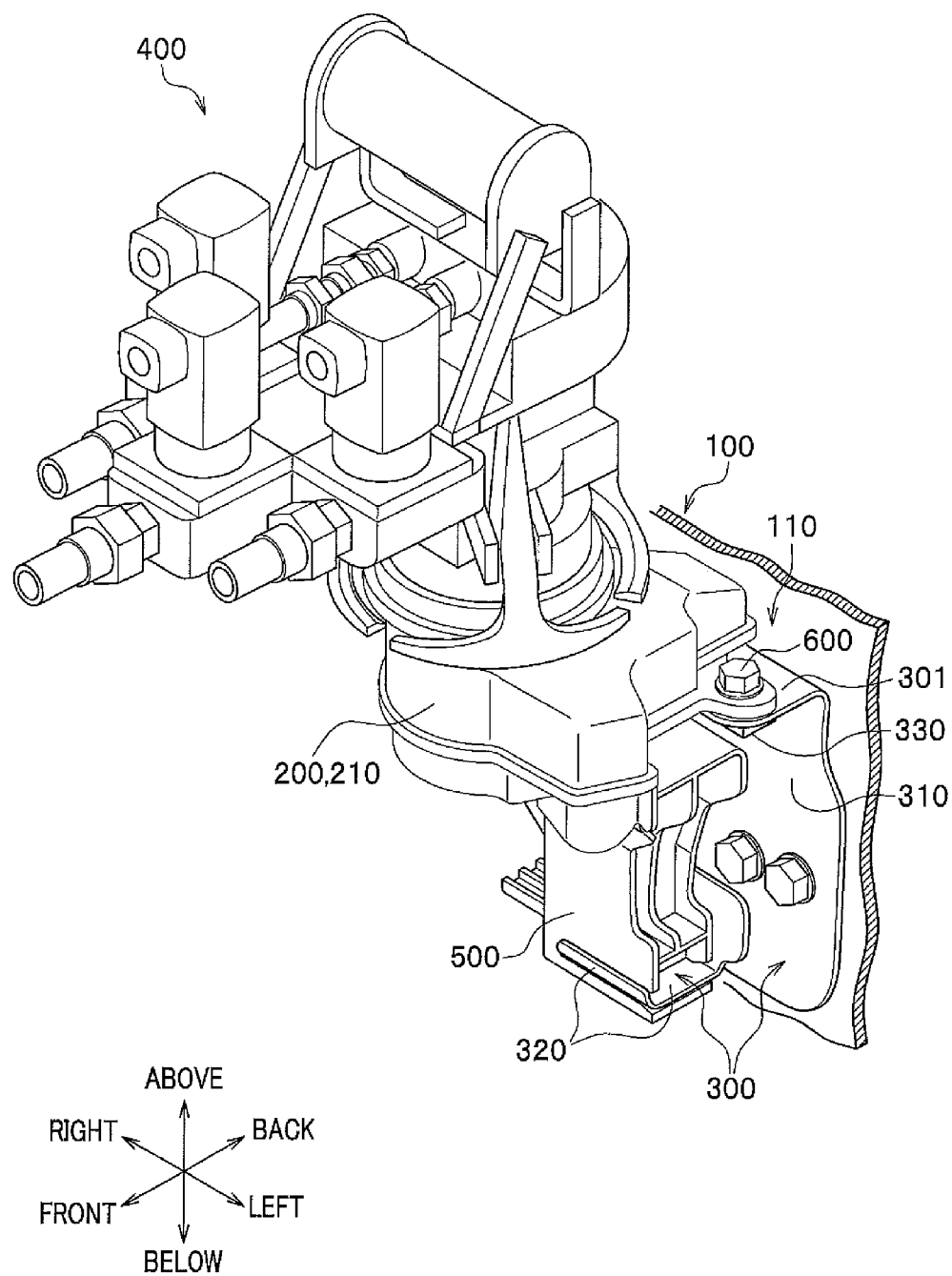
FIG. 7 is a perspective view of the conventional bracket, the view showing a state that the accessory is secured thereto.

Note that the brake-fluid vacuum charging jig 4 has a same structure as the conventional brake-fluid vacuum charging jig 400 (see FIGS. 6 and 7).

<Configuration of Clutch Reservoir>

Figure 4:
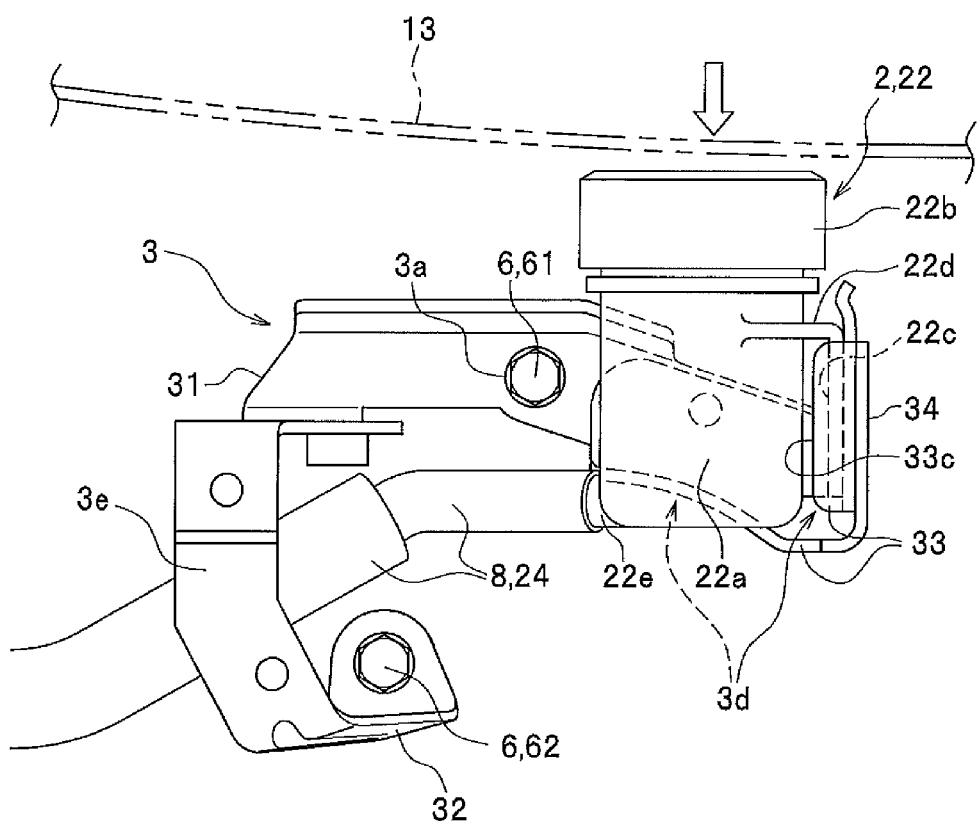
FIG. 4 is a view of the vehicle bracket according to the embodiment of the present invention, the view showing an example of a state in which a clutch reservoir is installed.

As shown in FIG. 4, the clutch reservoir 22 is a tank to reserve a clutch fluid for clutching. The clutch reservoir 22 mainly includes a second tank body 22a of resin and a lid 22b for closing an opening (not shown) of the second tank body 22a. The clutch reservoir 22 is positioned in an upper space in the engine room 12, and higher than a clutch master cylinder of a clutch device (not shown), to allow the clutch fluid to smoothly enter the clutch master cylinder.

The second tank body 22a has an outer periphery that is integrally formed with all of a fitting piece 22c, a contact portion 22d and a piping connecting portion 22e. The fitting piece 22c is to be held in holding portions 33c of the bracket 3 to be mentioned later. The contact portion 22d is to come into contact with upper edges of the respective holding portions 33c. The piping connecting portion 22e is to fit in a pipe 24.

The fitting piece 22c is an integrally formed thick square plate that extends vertically along a side surface of the second tank body 22a.

The contact portion 22d is an integrally formed flat plate that extends horizontally from a top of the fitting piece 22c to the side surface of the second tank body 22a.

<Configuration of Bracket>

As shown in FIG. 2, the bracket 3 (vehicle bracket) is a fixing member for fixing the accessory or accessories 2 to the vehicle body 11. The bracket 3 is made up of, for example, a first plate member 31, a second plate member 32, a third plate member 33 and a fourth plate member 34, all of which are made of sheet metal pieces that are given desired shapes by press-working. These four metal plate members are welded and joined together to form an integrated body by welding. The bracket 3 has an upper anchoring portion 3a to be mentioned later, a lower anchoring portion 3b to be mentioned later, the first supporting portion 3c, and a second supporting portion 3d.

Note that the bracket 3 may be installed in any space inside the engine room 12. In the following example, the bracket 3 is anchored to the partition wall 12c (the inner wall 12a). The bracket 3 is bolted to and supported by the partition wall 12c (the vehicle body 11) at two points, that is, the upper anchoring portion 3a and the lower anchoring portion 3b.

Further, the bracket 3 may have either only one accessory or two accessories 2 fixed thereto. That is, the bracket 3 may have either only one or both of the brake reservoir 21 and the clutch reservoir 22 fixed thereto.

<Configuration of First Plate Member>

Figure 5:
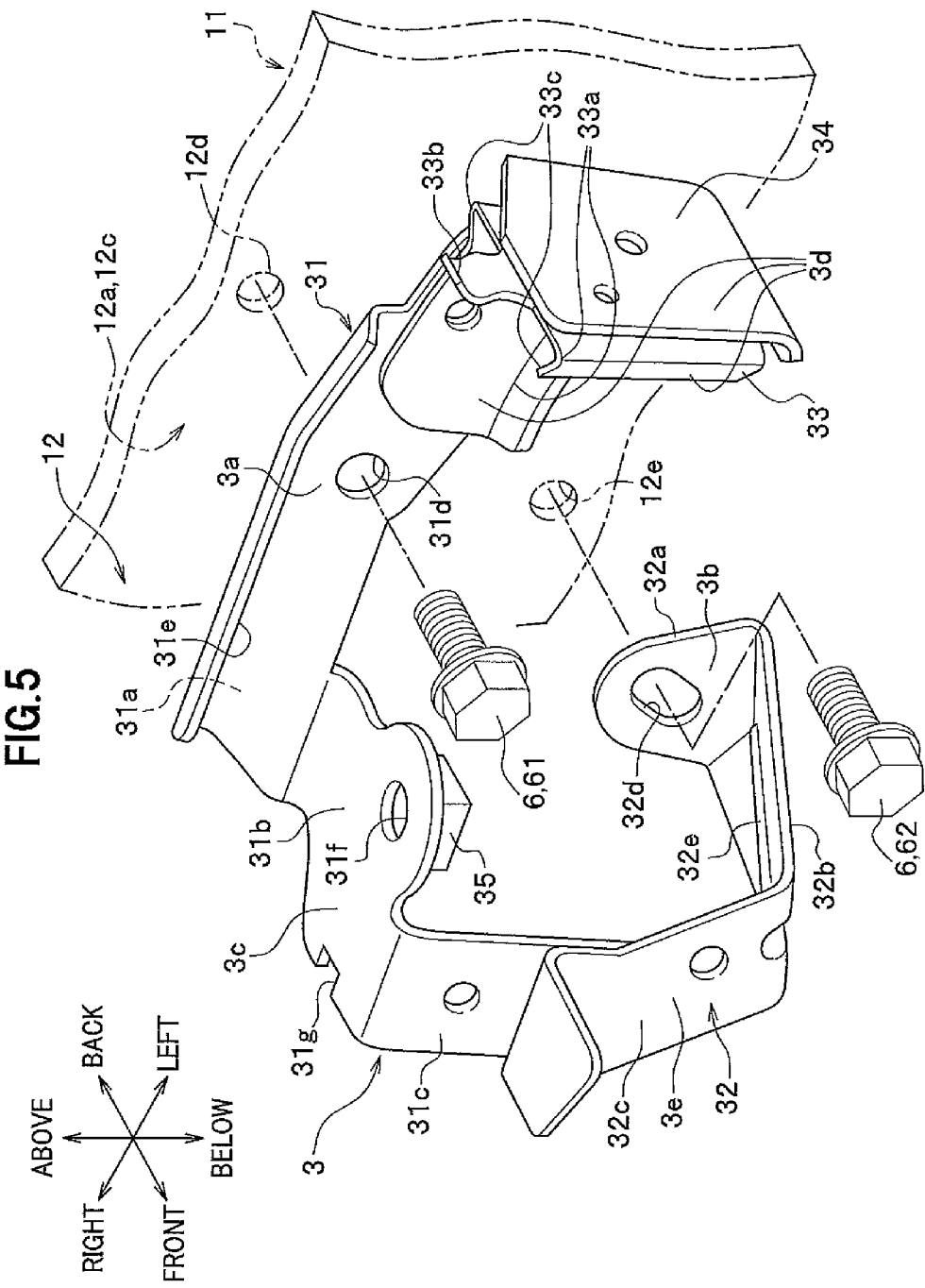
FIG. 5 is an enlarged perspective view of the vehicle bracket of FIG. 2.

As shown in FIG. 5, the first plate member 31 includes a first contact surface 31a, a bearing surface 31b, and a hanging portion 31c. The first contact surface 31a is in contact with the inner wall 12a when the bracket 3 is anchored to the inner wall 12a of the engine room 12. The bearing surface 31b is to have the fixing piece 21f (see FIG. 2) placed thereon. The hanging portion 31c is spaced apart from the inner wall 12a.

The first contact surface 31a is formed in the shape of a strip which extends transversely of the vehicle and which is substantially straight in a vertical width thereof conforming to the shape of a surface of the partition wall 12c to which the first plate member 31 is anchored. The first contact surface 31a has the shape of a strip that extends in a transverse direction of the vehicle. The bearing surface 31b extends from the lower right of the first contact surface 31a. The third plate member 33 is welded to a left end portion of the first contact surface 31a. The first contact surface 31a has a fixing hole 31d and a reinforcing bent part 31e. The fixing hole 31d is formed substantially in the middle of the first contact surface 31a for permitting insertion of an external thread portion of a first fixing bolt 61. The reinforcing bent part 31e is formed by bending the entire upper edge of the first contact surface 31a in an approximately L-shape.

The bearing surface 31b is a horizontally extending surface to which the brake reservoir 21 (see FIG. 2) is fixed. The bearing surface 31b has a through hole 31f, a fixing nut 35, and a positioning part 31g. The through hole 31f is formed substantially at a center of the bearing surface 31b for permitting insertion of the reservoir-fixing bolt 7 therethrough. The fixing nut 35 is welded to a lower surface of the bearing surface 31b around the periphery of the through hole 31f. The positioning part 31g is adapted to fit a positioning projection (not shown) formed on the brake reservoir 21 by cutting away an area in an outer edge of the bearing surface 31b.

The hanging portion 31c is a portion that hangs downwardly from a bend formed on a front edge of the bearing surface 31b. The hanging portion 31c is spaced apart from, and located ahead of, both the first contact surface 31a and a second contact surface 32a to be mentioned later.

The fixing hole 31d is a hole that is used as a reference for anchoring the bracket 3 to the partition wall 12c.

<Configuration of Second Plate Member>

As shown in FIG. 5, the second plate member 32 is a plate member that is joined and coupled to the front edge of the first plate member 31. The second plate member 32 has the second contact surface 32a, an arm part 32b and an upright part 32c. The second contact surface 32a is in contact with the partition wall 12c when the bracket 3 is anchored to the partition wall 12c of the engine room 12. The arm part 32b extends forwards from the second contact surface 32a. The upright part 32c is spaced apart from the inner wall 12a.

The second contact surface 32a is a tab that is formed in the shape of a tongue which is substantially straight in the vertical direction to fit the shape of the surface of the partition wall 12c to which the second plate member 32 is anchored. The second contact surface 32a has a slot 32d for permitting insertion of a first fixing bolt 61 therethrough. The slot 32d extends diagonally from the upper left to lower right to make the inserted first fixing bolt 61 movable along the slot 32d for adjusting the position of the inserted first fixing bolt 61.

The arm part 32b is bent throughout to have a substantially V-shape vertical cross-section. Further, the arm part 32b has a reinforcing rib 32e along a center line thereof on an upper surface thereof. The reinforcing rib 32e projects upwards to have a semi-circular cross section.

The upright part 32c is a portion formed by bending upwards at a front edge of the arm part 32b. The upright part 32c has an upper end portion that is joined to the hanging portion 31c by welding or the like. The upper end portion of the upright part 32c has a top end portion that is bent and extends horizontally to the front.

<Configurations of Third and Fourth Plate Members>

As shown in FIG. 5, the third plate member 33 is a substantially L-shaped plate member when viewed from the top. The third plate member 33 is joined to the left edge of the first plate member 31 by welding or the like and integrated therewith. The third plate member 33 is formed with reinforcing bent parts 33a, a protruding strip 33b, and the holding portions 33c. The reinforcing bent parts 33a are formed respectively along a lower edge and a front edge of the third plate member 33. The protruding strip 33b extends upwards from an upper edge of the third plate member 33. The holding portions 33c are to hold the contact portion 22d of the clutch reservoir 22 (see FIG. 2) therebetween.

The fourth plate member 34 is a reinforcing member that is in face-to-face contact with, and joined to, a left surface of the third plate member 33.

<Configurations of Upper and Lower Anchoring Portions>

The upper anchoring portion 3a is a portion to be in contact with the partition wall 12c when the bracket 3 is anchored to the partition wall 12c with the first fixing bolt 61 inserted through the fixing hole 31d of the upper anchoring portion 3a.

The lower anchoring portion 3b at a tip end is a portion at which the bracket 3 is anchored to the partition wall 12c. The lower anchoring portion 3b is sufficiently spaced apart from the upper anchoring portion 3a to a location below the upper anchoring portion 3a to create a large span for supporting the bracket 3 at the partition wall 12c.

<Configuration of First Supporting Portion>

As shown in FIG. 5, the first supporting portion 3c is a portion for securing thereto an accessory, that is, the brake reservoir 21 (see FIG. 2). The first supporting portion 3c forms an upper part of a ring section 3e connecting the upper anchoring portion 3a and the lower anchoring portion 3b. The first supporting portion 3c is a portion serving as the bearing surface 31b. The first supporting portion 3c is formed in a portion extending forward (in a distancing direction) from the upper anchoring portion 3a. In other words, the first supporting portion 3c, located between the upper anchoring portion 3a and the lower anchoring portion 3b that anchor the bracket 3 to the partition wall 12c, is horizontally distanced from the upper anchoring portion 3a. When being anchored to the partition wall 12c, the first supporting portion 3c, together with the partition wall 12c, forms the ring section 3e that has an approximate ring shape.

<Configuration of Second Supporting Portion>

As shown in FIG. 5, the second supporting portion 3d is a portion for securing to the bracket 3 the clutch reservoir 22 (see FIG. 2) as another accessory 2 that is not the brake reservoir 21. The second supporting portion 3d extends from the upper anchoring portion 3a. The second supporting portion 3d is located to the left of the first supporting portion 3c (and horizontally opposed thereto). In other words, the second supporting portion 3d extends vertically and supports the clutch reservoir 22 (see FIG. 2) with a vertical plane thereof.

As shown in FIG. 5, the ring section 3e is a section of the bracket 3 with an approximately U-shaped vertical cross section. The ring section 3e is formed of the upper anchoring portion 3a and the hanging portion 31c of the first plate member 31 and the arm part 32b and the upright part 32c of the second plate member 32 to have an approximately U-shaped cross section. The ring section 3e is capable of having a component 8 such as the pipe 24 (see FIG. 4) inserted therethrough to facilitate installation of the component 8 in the engine room 12.

<Configurations of Reservoir-Fixing Bolt and Fastening Members>

As shown in FIG. 2, the reservoir-fixing bolt 7 is a bolt for fixing the brake reservoir 21 to the bracket 3.

The fastening members 6 are fastening members for anchoring the bracket 3 to an area of the vehicle body 11 such as the partition wall 12c. The fastening members 6 may be, for example, washer based bolts, bolts for general purpose, or weld bolts. There are two fastening members 6: the first fixing bolt 61 for anchoring the upper anchoring portion 3a to the partition wall 12c; and a second fixing bolt 62 for anchoring the lower anchoring portion 3b to the partition wall 12c.

The first fixing bolt 61 is engaged with an internal thread 12d formed through the partition wall 12c. The second fixing bolt 62 is engaged with an internal thread 12e formed through the partition wall 12c. Note that the internal threads 12d, 12e may be substituted with nuts (not shown) attached to a back side of the partition wall 12c.

<Working>

Now, there will be described the working of the vehicle bracket according to the embodiment of the present invention, along with a procedure of fixing the brake reservoir 21 to the vehicle body 11, with reference to FIGS. 1-5.

First, a description will be made of how to anchor the bracket 3 to the partition wall 12c (the vehicle body 11) with reference to FIG. 2. The first fixing bolt 61 is inserted through the fixing hole 31d and then engaged with the internal thread 12d to anchor the upper anchoring portion 3a of the bracket 3 to the partition wall 12c. Next, the second fixing bolt 62 is inserted through the slot 32d and then engaged with the internal thread 12e with fine adjustment of the position of the internal thread 12e to anchor the lower anchoring portion 3b of the bracket 3 to the partition wall 12c. Thus, fixation of the bracket 3 to the partition wall 12c is completed.

The bracket 3 is thus anchored to the inner wall 12a of the engine room 12 (see FIG. 1). The bracket 3 is firmly fixed since the upper anchoring portion 3a is vertically sufficiently spaced apart from the lower anchoring portion 3b to create a large span (a distance between the upper anchoring portion 3a and the lower anchoring portion 3b) and thereby to ensure firm support of the bracket 3.

Now, a description will be made of how to inject the brake fluid 4 into the brake reservoir 21 with reference to FIG. 2.

First, the fixing piece 21f of the brake reservoir 21 is placed on the first supporting portion 3c of the bracket 3, then an external thread portion of the reservoir-fixing bolt 7 is inserted through the through holes 21j, 31f, and the external thread of the reservoir-fixing bolt 7 is engaged with the fixing nut 35 to fix the brake reservoir 21 to the bracket 3.

Next, the coupling portion 41 of the brake-fluid vacuum charging jig 4 is coupled with the flange portion 21g formed along the outer periphery of the opened cavity 21c of the brake reservoir 21 to set the brake-fluid vacuum charging jig 4 on the brake reservoir 21, as shown in FIG. 3. Then, the brake fluid is injected through the brake-fluid vacuum charging jig 4 into the cavity 21c of the brake reservoir 21.

After the injection, the brake-fluid vacuum charging jig 4 is removed from the brake reservoir 21, and then a cap 21b (see FIG. 1) is fitted over the cavity 21c.

When the brake fluid is injected through the brake-fluid vacuum charging jig 4 placed on the brake reservoir 21 as described above, loads of the brake reservoir 21, the brake-fluid vacuum charging jig 4 and the brake fluid are applied to the first supporting portion 3c of the bracket 3. As shown in FIG. 5, the bracket 3 includes the ring section 3e that has an approximately U-shaped vertical cross section. The ring section 3e is formed of the hanging portion 31c, the upright part 32c, and the arm part 32b that are continuous with one another. As described above, the upper anchoring portion 3a, located at an upper end of the ring section 3e, is sufficiently spaced apart from the lower anchoring portion 3b, located at a lower end of the ring section 3e, to create a large span for supporting the bracket 3 at the two points and thereby to ensure firm fixation of the bracket 3 to the partition wall 12c.

Further, the arm part 32b of the ring section 3e, which forms a lower part thereof, is reinforced by having the approximately V-shaped vertical cross section and by having the reinforcing rib 32e along the center line thereof. The approximately V-shaped cross section and the reinforcing rib 32e of the arm part 32b increase the strength of the bracket 3 to withstand a load vertically applied to the bracket 3. Thus, the bracket 3 is strong enough to firmly support the brake reservoir 21 and the brake-fluid vacuum charging jig 4 without aid of the conventionally utilized propping-up jig 500 (see FIG. 6).

Consequently, there is no need to use the conventionally utilized propping-up jig 500 (see FIG. 6), which leads to a reduction in the number of steps taken in a manufacturing line.

Now, descriptions will be made of a case in which a pedestrian is hit by the vehicle 1 and thrown up onto the hood 13, with reference mainly to FIG. 1.

The hood 13 possesses cushioning properties enough to absorb the impact of collision with the pedestrian by being deformed and bent downwardly as shown by the long dashed double-short dashed lines when the pedestrian is thrown up by the front bumper onto the hood 13. If the hood 13 is deformed downwardly greatly, the hood 13 is sometimes caused to apply a downward pressure to the cap 21b of the brake reservoir 21 in the engine room 12.

In such a case, a load is applied to the first supporting portion 3c of the bracket 3 with the brake reservoir 21 placed thereon. The first supporting portion 3c is a part of the ring section 3e that has an approximately U-shaped vertical cross section and that is supported at the two points by the partition wall 12c. Thus, the load applied to the first supporting portion 3c of the bracket 3 is relieved by the hanging portion 31c and the upright part 32c downwardly displaced to cause the ring section 3e to be elastically deformed and bent. In other words, the ring section 3e is elastically bent to allow the bracket 3 to absorb the impact of collision with the pedestrian to a greater extent.

Note that, in normal conditions, the bracket 3, which has both cushioning properties and strengths to counter the applied loads, is kept firmly anchored to the partition wall 12c without rattling due to the vibration of the vehicle 1 that is running.

Now, descriptions will be made of how to secure the clutch reservoir 22 to the bracket 3 with reference mainly to FIG. 4.

As shown in FIG. 4, the fitting piece 22c of the clutch reservoir 22, with a clutch fluid filled therein, is inserted into the holding portions 33c of the bracket 3 anchored to the partition wall 12c to bring the contact portion 22d into contact with the upper edges of the respective holding portions 33c, thereby fixing the clutch reservoir 22 to the bracket 3.

Further, if the clutch reservoir 22 is intended to be firmly fixed to the bracket 3, a screw (not shown) can be screwed from the outside of the second supporting portion 3*d* through the bracket 3 into the fitting piece 22*c* of the clutch reservoir 22.

As described above, the clutch reservoir 22 is able to be firmly fixed to the bracket 3, whether the clutch reservoir 22 alone is fixed to the bracket 3 or the clutch reservoir 22, together with the brake reservoir 21, is fixed to the bracket 3.

The bracket 3, which has the first plate member 31 and the third plate member 33 joined together, has functions of two brackets combined that can respectively hold different components. The first plate member 31 has the first supporting portion 3*c* for holding the brake reservoir 21. The third plate member 33 has the second supporting portion 3*d* for holding the clutch reservoir 22.

The second supporting portion 3*d* extends to the left from the upper anchoring portion 3*a* anchored to the vehicle body 11 by the first fixing bolt 61. Thus, the second supporting portion 3*d*, like a cantilever, is elastically deformable. As a result, even if a downward pressure is applied to the lid 22*b* of the clutch reservoir 22 by the hood 13, the load applied to the clutch reservoir 22 is relieved by the second supporting portion 3*d*.

Consequently, the bracket 3 can also support the clutch reservoir 22 with the combination of cushioning properties and strengths.

While an embodiment has been described, it is to be understood that the invention is not limited thereto and that variations and changes may be made without departing from the spirit and scope of the invention.

<Modifications>

In the embodiment, the brake reservoir 21 and the clutch reservoir 22 have been mentioned as examples of the accessory or accessories 2 fixed to the bracket 3 anchored to the partition wall 12*c*. However, other than the brake reservoir 21 and the clutch reservoir 22, the accessory or accessories 2 may be tank(s), device(s), or other component(s) 8.

Further, the partition wall 12*c* of the engine room 12 has been mentioned as an example of an area to which the bracket 3 is installed. However, other than areas of the engine room 12, the bracket 3 may be installed properly to any area of the vehicle body 11 that allows the upper anchoring portion 3*a* and the lower anchoring portion 3*b* to be anchored thereto by the fastening members 6.

The bracket 3 is applicable to the vehicle 1 of any type as a bracket for securing the component 8 thereto and thereby to the vehicle 1.

The invention claimed is:

1. A vehicle bracket installed in an engine room of a vehicle for supporting accessories, the vehicle bracket comprising:
an upper anchoring portion for anchoring the vehicle bracket to a vehicle body;
a lower anchoring portion for anchoring the vehicle bracket to the vehicle body, the lower anchoring portion located below the upper anchoring portion;
a first supporting portion for securing one of the accessories thereto, the first supporting portion extending vertically between the upper anchoring portion and the lower anchoring portion; and
a second supporting portion for securing the other accessory thereto, the second supporting portion extending from the upper anchoring portion and being horizontally opposed to the first supporting portion,
the upper anchoring portion, the lower anchoring portion, the first supporting portion, and the second supporting portion forming an integrated body,
wherein:
the accessory secured to the first supporting portion is a brake reservoir; and
the accessory secured to the second supporting portion is a clutch reservoir.

2. The vehicle bracket of claim 1, wherein:
the first supporting portion is formed as a part of a ring section having an approximately ring shape; and
the ring section is capable of having a component inserted therethrough to facilitate installation of the component in an engine room.

3. The vehicle bracket of claim 2 wherein:
the accessory secured to the first supporting portion is a brake reservoir; and
the accessory secured to the second supporting portion is a clutch reservoir.

4. The vehicle bracket of claim 3 wherein the vehicle bracket is formed of a plurality of plate members joined together by welding.

5. The vehicle bracket of claim 2 wherein the vehicle bracket is formed of a plurality of plate members joined together by welding.

6. The vehicle bracket of claim 1 wherein the vehicle bracket is formed of a plurality of plate members joined together by welding.

7. A vehicle bracket installed in an engine room of a vehicle for supporting accessories, the vehicle bracket comprising:
an upper anchoring portion for anchoring the vehicle bracket to a vehicle body;
a lower anchoring portion for anchoring the vehicle bracket to the vehicle body;
a first supporting portion for securing one of the accessories thereto, the first supporting portion extending vertically between the upper anchoring portion and the lower anchoring portion,
the first supporting portion being horizontally distanced from the upper anchoring portion; and
a second supporting portion for securing the other accessory thereto, the second supporting portion extending horizontally from the upper anchoring portion,
wherein:
the accessory secured to the first supporting portion is a brake reservoir; and
the accessory secured to the second supporting portion is a clutch reservoir.

* * * * *